United States Patent Office 3,374,867
Patented Mar. 26, 1968

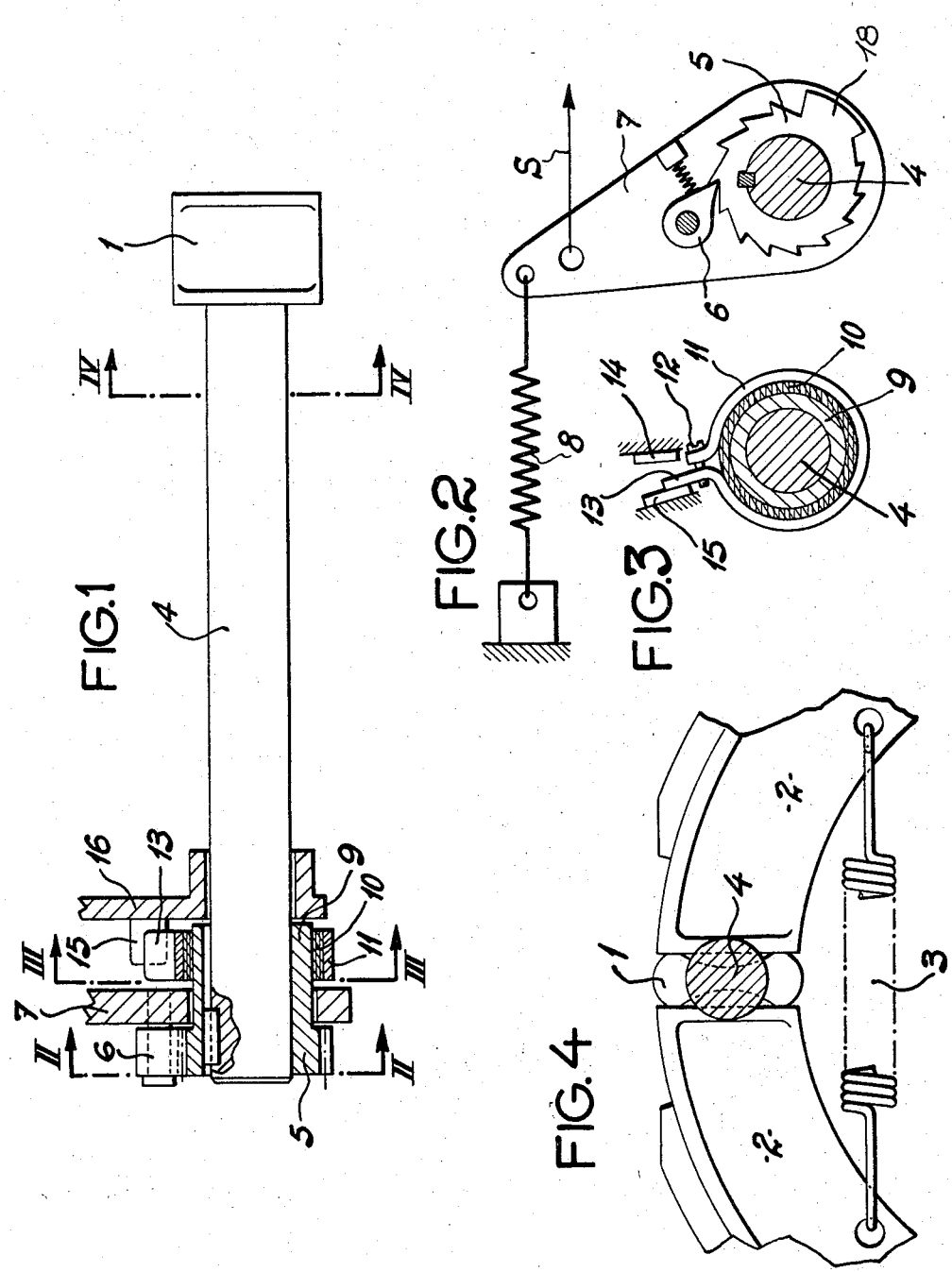

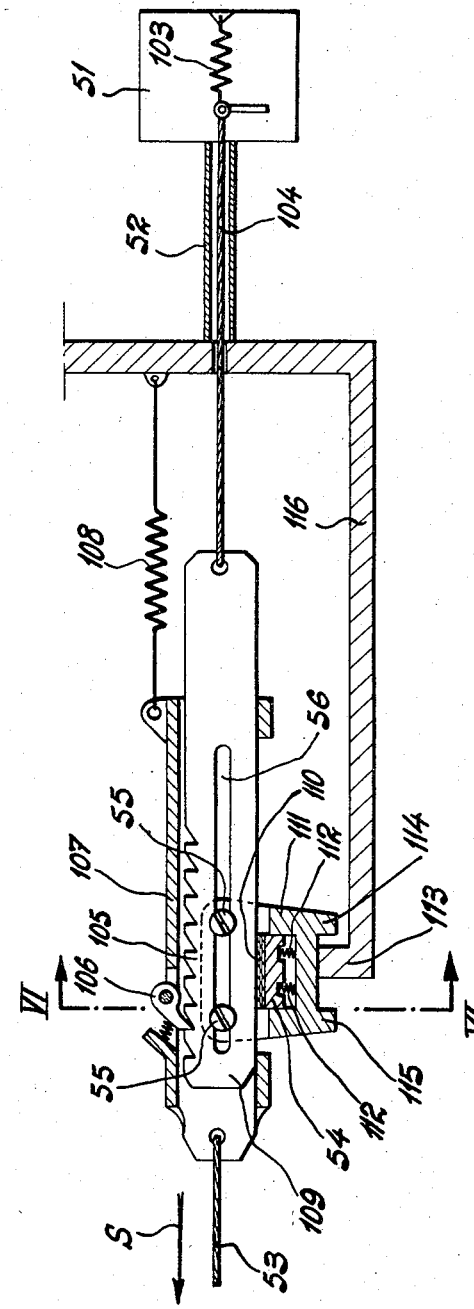
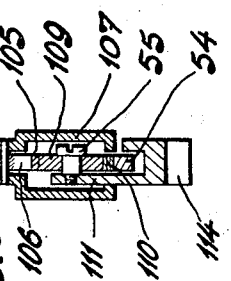

3,374,867
AUTOMATIC DEVICE FOR TAKING UP WEAR
IN THE LININGS OF BRAKES
Max Henry Pirard, Chateau de la Cachette,
Nouzonville, Ardennes, France
Filed May 16, 1966, Ser. No. 550,247
Claims priority, application France, Dec. 29, 1965,
44,142
5 Claims. (Cl. 188—79.5)

ABSTRACT OF THE DISCLOSURE

Braking system in which operator control is coupled to a brake by a ratchet and pawl in turn connected to a friction device which slips for taking into account the wear of the brake.

The present invention relates to an automatic device for taking up wear in the linings of brakes of all types, and more particularly to an automatic wear taking up device which is mounted on a rotating or sliding member of the brake gear, for example, of the brake of a heavy lorry.

The necessity of insuring substantially complete safety for large vehicles involves frequent adjustments for taking up the wear in brake linings. While this take up adjustment of the lining is a fairly simple operation, it is tedious and is consequently often neglected by drivers. A brake control system which permits automatic take up of wear is therefore advantageous.

In the present state of known technique, automatic devices for taking up wear already exist for hydraulically-operated brakes, in which devices there are pistons and jacks which lend themselves to simple constructions. However, the present invention relates to brakes provided with mechanical operation means comprising a brake-operating gear, and in particular to brakes which are universally employed on trailers and half-trailers of large vehicles, the control rod system of which is actuated, sometimes by a brake handlever but generally by a pneumatic jack.

In consequence the invention has for its object the provision of an automatic device for taking up wear which can be mounted on all brakes of any type, with drums and jaws, with discs and shoes, etc., in which the application and release of the brakes are obtained by means of a brake gear comprising either a rotating member (for example a shaft), or a sliding member (for example a traction rod), on which the take up device is mounted.

The automatic wear take up device according to the invention comprises essentially a friction device mounted on the said rotating or sliding member of the brake gear and driven by the said member within the limits allowed by two abutments separated by a space corresponding to the normal play of the brake, through the intermediary of a friction member, the friction of which is predetermined, preferably adjustable, and greater than the restoring force on release, applied to the active members of the brake (for example by the restoring spring of the jaws or brake-shoes). Furthermore, the automatic take up of wear according to the invention comprises a de-clutching device interpoesd upstream of the friction device, for example between the drive of the brake-gear and the brake-gear itself, and capable of freeing the drive from the brake-gear when the drive acts in the direction of release of the brake.

The operation of the automatic wear take up device according to the invention is as follows: for the application of the brake, the de-clutching device transmits the drive to the brake-gear and the latter applies the brakes, first driving the friction device up to the corresponding fixed abutment; then the friction device remains against this fixed abutment, slipping if there is wear of the linings. For releasing the brake, the return of the working members (jaws or shoes) effects the release movement of the latter until the friction device comes up against the other fixed abutment, which insures their normal play; simultaneously, the drive moves back during release by the corresponding travel, and then, if there is wear of the linings, by an additional travel, which is permitted by the de-clutching device without driving the brake gear. It will be noted that as a whole, the supplementary travel corresponding to the wear of the linings is thus located between the drive and the brake-gear, and is absorbed by the de-clutching device; in consequence, a subsequent braking action finds the brake ready to operate with only the normal play.

Two preferred embodiments of the invention will be described below by way of non-limitative examples. One of these embodiments concerns a brake with jaws, and the above-mentioned rotating member is the shaft of which the cam actuates the jaws. The other embodiment concerns a brake in which the above-mentioned sliding member is the cable of a conventional flexible transmission, well known under the name of Bowden. These two embodiments will be described with reference to the accompanying drawings given by way of example only and not in any limitative sense. In the drawings:

FIG. 1 is an axial diagrammatic section of the assembly of the first preferred embodiment;

FIGS. 2, 3 and 4 are partial cross-sections taken along lines II—II, III—III and IV—IV of FIG. 1;

FIG. 5 is a diagrammatic longitudinal section of the assembly of the second preferred embodiment; and FIG. 6 is a partial cross-section taken along line VI—VI of FIG. 5.

FIGS. 1 to 5 show a force transmitting cam 1 acting on jaws 2 in a conventional manner for jaw brakes, but the assembly is also applicable, as already stated, for any member which controls the opening of the jaws or the application of a disc brake. These jaws are returned to the released position by a spring 3. The cam 1 is extended by a shaft 4, on which is fixed, according to the invention, a ratchet wheel 5. This ratchet wheel is driven by a conventional pawl system 6, irrespective of the construction of this pawl. The assembly of the wheel 5 and pawl 6 may furthermore be a free-wheel of any known type, constituting the de-clutching device according to the invention.

The operator control lever 7 is freely mounted on an extension of the hub of the wheel 5 and it is returned to its initial position by a spring 8 fixed to a connected portion of the vehicle. It will be observed that, as already stated, when applying the brake (arrow S of FIG. 2), the lever 7 drives the shaft 4 positively through a de-clutching device including pawl 6 and the wheel 5, while when the brake is released, the lever 7 can return in the direction opposite to the arrow S without driving the shaft 4.

On the wheel 5 is also mounted the friction device according to the invention, constituted by an extension 9 of its hub, on which is mounted a friction lining 10 gripped by a collar 11 by means of a device such as a screw 12, enabling the friction torque to be adjusted. This friction device may furthermore be produced in any other manner permitting the same result to be obtained.

The collar 11 comprises an arm 13 movable between two abutments 14 and 15 attached to a fixed portion of the vehicle, for example to the support 16 which serves as a bearing for the shaft 4. The distance between these two abutments 14 and 15 is such that the arm 13 can move through an angle which corresponds to the minimum travel necessary for the release of the jaws after a braking operation, that is to say to the play of the brake, as already stated.

When the brake is applied by actuating the lever 7 in the braking direction (arrow S), the pawl 6 drives the wheel 5 and the collar 11 through the intermediary of the lining 10, until the arm 13 of this collar 11 comes into contact with the right-hand abutment 14. The friction torque due to the lining 10 being much less than the torque which is applied to the wheel 5 by means of the lever 7, this wheel 5 continues its travel until the braking action is complete. The collar 11 is then displaced through a certain angle on the cylinder 9, this angle corresponding to the play caused by wear of the jaws due to braking.

At the moment of release of the brake, the lever 7, restored simultaneously by the spring 8 and by the spring 3 acting on the cam 1 through the intermediary of the jaws 2, returns to its initial position. The collar 11 moves back until its arm 13 comes into contact with the left-hand abutment 15. As the friction torque has been determined at a value greater than that necessitated by the operation of the pawl 6, this pawl 6 lifts so as to permit the lever 7 to return to its initial position.

If the number of teeth or pawls has been calculated so that the angular displacement of the wheel 5 corresponding to one tooth is less than the angular displacement of the lever 7 under the effect of the mechanical force which applies the brake, the wheel 5 can therefore be displaced by one tooth with respect to the lever 7 as soon as the wear of the jaw linings has become sufficient.

The result obtained is therefore that which was desired, and it is clear that the movement of the lever 7 will have a maximum value corresponding to one tooth of the wheel 5, and in consequence less than the travel which is available to effect the braking, whether by the effect of a purely mechanical control or by the action of a pneumatic cylinder having a limited distant travel.

It is evident that such a system which eliminates all action on the part of the driver could lead to a complete lack of maintenance and in consequence to complete wear of the brake linings, resulting in a metal-to-metal contact and damage to the main parts of the brake. In order to avoid this drawback, it is possible according to the invention to provide an abutment which prevents the operation of the lever 7 at the end of a take-up travel less than the total wear of the linings. By way of example, this abutment may be the number of teeth of the wheel 5 which are not cut over the whole periphery, as shown at 18 in FIG. 2, or alternatively an abutment on the shaft 4 coming into contact with a fixed part of the brake, etc.

FIGS. 5 and 6 show another application of the invention. The braking members, shown diagrammatically by the block 51, are provided with a flexible control sheath 52. There are again found here the members corresponding to those of FIGS. 1 to 4, with the same reference numbers increased by 100.

The rotating shaft 4 of the first application is replaced by the sliding cable 104 in the sheath 52, coupled to the toothed rack 105 carried by the sliding plate 109. The toothed rack 105 and the pawl 106 carried by the socket 107 constitute the de-clutching device according to the invention.

The socket 107 is actuated by a driving cable 53 and is returned during the release of the brake by a restoring spring 108. The friction device according to the invention comprises a friction lining 110, clamped on the sliding-plate 109 by a push-plate 54 and two supporting springs 112. The push-plate 54 is retained in a slide 111 which is slidably mounted on the slide-plate 109 by two screws passing into a slot 56 formed in the slide-plate 109, and provided with two abutments 114 and 115 co-operating with an arm 113 of the fixed portion 116.

The operation of this second application remains the same as that described with reference to the first application, except that the relative rotations of the parts are replaced by equally relative movements of translation of the corresponding parts. In this sense, the co-operation of the two fixed abutments 14 and 15 and the rotating member 13 is identical, for those skilled in the art, with the co-operation of the two sliding abutments 114 and 115 and the fixed member 113.

What I claim is:

1. A braking system with automatic adjustment for wear comprising braking means, force transmission means displaceable from a position of rest to move and actuate said braking means, spring means to restore said transmission means to a position of rest, operator control means for controlling a braking operation, declutching means coupling said control means to said force transmission means for actuating said braking means, said control means having a normal idle position, means to return the control means to said idle position after a braking operation, said declutching means including a first part coupled to said control means and a second part coupled to said force transmission means, said first and second parts being unidirectionally engageable, friction means frictionally engaged with said second part and adapted to move therewith, and limit means to limit the travel of said friction means such that after a predetermined movement of the latter said second part can move relative thereto under the control of said control means and said operator whereafter, upon release of the control means by the operator, said spring means tends to restore said transmission means to a position of rest, said second part being carried along by said transmission means, said friction means tending to follow said second part but being limited by said limit means and engaging said second part with a force sufficient to limit movement of the second part, said transmission system including rotary force transmission means including a rotary shaft and said second part including a ratchet encircling and fixed to said shaft and said first part being a pawl engaging said ratchet.

2. A system s claimed in claim 1, wherein said first and second parts are pawl and ratchet means.

3. A system as claimed in claim 1 comprising indicating means for indicating when a predetermined magnitude of displacement between said second part and friction means has been exceeded.

4. A system as claimed in claim 1, wherein said ratchet includes peripheral teeth over a limited peripheral portion.

5. A system as claimed in claim 1 comprising means to adjust said friction means.

References Cited
UNITED STATES PATENTS

| | | | |
|---|---|---|---|
| 1,860,770 | 5/1932 | Bugatti | 188—79.5 |
| 3,115,217 | 12/1963 | Butler | 188—196 X |
| 3,211,263 | 10/1965 | Harrison | 188—196 |

DUANE A. REGER, *Primary Examiner.*